United States Patent [19]

Greer et al.

[11] Patent Number: 5,798,046
[45] Date of Patent: Aug. 25, 1998

[54] ENHANCED REMOVAL OF HYDROPHOBIC CONTAMINANTS FROM WATER CLARIFICATION SYSTEMS

[75] Inventors: Carol S. Greer, Lisle; Ann M. Capozzi; Linda S. Wilkins, both of Naperville, all of Ill.

[73] Assignee: Nalco Chemical Company, Naperville, Ill.

[21] Appl. No.: 700,000

[22] Filed: Aug. 20, 1996

[51] Int. Cl.$^6$ .................................. C02F 1/24; C02F 1/56
[52] U.S. Cl. ........................... 210/705; 210/714; 210/732; 210/734; 210/928
[58] Field of Search .................................. 210/705, 706, 210/707, 714, 928, 732, 734, 665, 666; 162/189, 190, 5, 199, 264

[56] References Cited

U.S. PATENT DOCUMENTS

| | | |
|---|---|---|
| 3,256,140 | 6/1966 | Posclmann . |
| 3,764,460 | 10/1973 | Miyamoto . |
| 3,873,418 | 3/1975 | Brax . |
| 4,008,161 | 2/1977 | Wong . |
| 4,076,578 | 2/1978 | Puddington . |
| 4,276,118 | 6/1981 | Quick . |
| 4,738,750 | 4/1988 | Ackel . |
| 4,886,575 | 12/1989 | Moreland . |
| 4,923,566 | 5/1990 | Shawki et al. . |
| 5,080,759 | 1/1992 | Evans et al. . |
| 5,173,208 | 12/1992 | Chung . |
| 5,230,808 | 7/1993 | Chung . |
| 5,256,254 | 10/1993 | Pease et al. . |
| 5,266,166 | 11/1993 | Dreisbach et al. . |
| 5,300,194 | 4/1994 | Welkener et al. . |
| 5,308,499 | 5/1994 | Dixon . |
| 5,342,538 | 8/1994 | Chung . |
| 5,405,495 | 4/1995 | Cosper . |

OTHER PUBLICATIONS

Martin Glanville, "The removal of contraries from waste-based stock", Pater Tech. Sep. 1990, pp. 32–35.
David S. Crowford, "Behaviour of wastepaper stickies in recycling mills", Appita Jul. 1992, pp. 257–259.
Evan M. wise & Johanne M. Arnold, "The role of specific gravity for removal of hot melt adhesives in recyclable grades", Tappi Journal Sep. 1992, pp. 181–185.
Terrance J. Coenen, "Problems with Stickies/Contaminants and Some Simple Ways to Improve with an Existing System", Progress in Paper Recycling, May 1993, pp. 91–95.

*Primary Examiner*—Thomas M. Lithgow
*Attorney, Agent, or Firm*—Thomas M. Breininger; Margaret M. Brumm

[57] ABSTRACT

The present invention provides a method for removing secondary fiber contaminants from paper mill process waters comprising adding a polyvinyl chloride, a cationic polymeric coagulant and a polymeric flocculant to paper mill process waters containing secondary fiber contaminants in an amount sufficient to agglomerate the secondary fiber contaminants to larger particles sizes, and removing the secondary fiber contaminants from the process water by a dissolved air flotation clarification technique. The addition of particulate polyvinyl chloride in combination with a polymeric coagulant and flocculant prior to the DAF clarification process causes the contaminants to become preferentially coated with the polyvinyl chloride particles. This coating is what causes the subsequent removal of the secondary fiber contaminants in the DAF clarification process to be more effective.

6 Claims, No Drawings

ENHANCED REMOVAL OF HYDROPHOBIC CONTAMINANTS FROM WATER CLARIFICATION SYSTEMS

BACKGROUND OF THE INVENTION

1. Field of the Invention

The present invention generally relates to a method for removing secondary fiber contaminants from paper mill process waters. More particularly, it relates to the removal of secondary fiber contaminants using a polyvinyl chloride in combination with a coagulant and a flocculant to agglomerate the fiber contaminants such that the contaminants may be more efficiently removed by dissolved air flotation clarification.

2. Description of the Prior Art

The problem of secondary fiber contaminant ("stickies") control in papermaking processes has previously been recognized for all types of papermaking processes.

Problems associated with stickies occur during the repulping and reuse of secondary fiber which contains materials such as (1) labels and envelopes with pressure sensitive adhesives such as styrene butadiene rubber and vinyl acrylates, (2) book and magazine bindings containing hot melt glues such as vinyl acetate polymers, (3) old corrugated containers or produce boxes with petroleum wax or polyethylene coatings, and (4) materials which contain packaging and other types of tape. During repulping, these secondary fiber contaminants sometimes remain associated with the fibers, but more often are released from the fibers and dispersed as small adhesive particles in the aqueous pulp slurry.

Stickies, being primarily hydrophobic, deformable and tacky by nature, will often agglomerate to form larger hydrophobic particles in the aqueous system of the papermaking process, resulting in numerous product quality and paper machine operational problems. Stickies frequently deposit on various components of the papermaking equipment, such as consistency regulators, screens, headboxes, wires, foils, Uhle boxes, rolls, felts, dryers and calendar rolls. Such deposition often causes reduced or lost paper machine production and excessive downtime for clean-up of deposits. Such deposition also causes inferior paper quality resulting from specks, defects, holes, tears and breaks in the sheet. Stickies are typically pliable and frequently have the same specific gravity as water and fiber, thus they are often difficult to separate from the pulp by mechanical operations such as screening and centrifugal cleaning. In paper mills that recycle their process water as well as use secondary fiber as a furnish source, problems due to stickie contaminants can be even more serious. In recycled process waters, stickies recirculate and "cycle up" in concentration, eventually causing system purges which lead to severe deposit and runnability problems.

Wood pitch is the tacky, resinous material which is released from wood in the form of a colloidal, oil-in-water dispersion during pulping. Typical wood pitch components include fatty acids, resin acids, triglyceride esters and other fats, waxes, fatty alcohols and hydrocarbons. White pitch is a term which refers to the polymeric latex binders found in paper coatings. Typical coating binders include polyvinyl acetates and styrene butadience resins. Stickies, wood pitch, white pitch and other hydrophobic materials typically found in papermaking processes (e.g. defoamers, sizing agents, wet strength resins) will typically associate, agglomerate and co-deposit as they come into contact with each other in the papermaking process streams.

Paper mills that deink recycled fiber and/or recycle their process water often employ dissolved air flotation (DAF) clarifiers to remove ink, stickies, pitch and other suspended solids (e.g. fiber fines, clay, dirt, etc.) from this water. Polymeric coagulants and flocculants are sometimes added to DAF influent streams to aid in the removal of such contaminants from the process waters entering the DAF clarifiers.

SUMMARY OF THE INVENTION

The present invention provides a method for removing secondary fiber contaminants from paper mill process waters comprising adding a polyvinyl chloride, a cationic polymeric coagulant and a polymeric flocculant to paper mill process waters containing secondary fiber contaminants in an amount sufficient to agglomerate the secondary fiber contaminants to larger particles sizes, and removing the secondary fiber contaminants from the process water by a dissolved air flotation clarification technique. The addition of particulate polyvinyl chloride in combination with a polymeric coagulant and flocculant prior to the DAF clarification process causes the contaminants to become preferentially coated with the polyvinyl chloride particles. This coating is what causes the subsequent removal of the secondary fiber contaminants in the DAF clarification process to be more effective.

DESCRIPTION OF THE PREFERRED EMBODIMENTS

The present invention pertains to the use of polyvinyl chloride as a novel agglomerating agent for use in removing secondary fiber contaminants from paper mill process waters. The preferred method for removal of secondary fiber contaminants from paper mill process waters comprises adding a polyvinyl chloride, a cationic polymeric coagulant and a polymeric flocculant to paper mill process waters containing secondary fiber contaminants (so-called "stickies") in an amount sufficient to agglomerate the contaminants to larger particle sizes, and removing the contaminants by dissolved air flotation clarification.

The agglomeration is preferably conducted at a temperature in the range between about 70° F. to about 160° F., more preferably from about 100° F. to about 140° F.

The present invention provides a method of agglomeration of secondary fiber contaminants to larger particle sizes that permit the separation of such contaminants by a dissolved air flotation clarification technique which would be insufficient if employed on untreated influent process water. Thus, the present invention provides a method whereby both small and large stickie particles are removed from the paper mill process water.

The DAF influent process water generally should be under at least some degree of mechanical agitation at the time of treatment by the addition of the polyvinyl chloride thereto and a time period thereafter. As a general guideline, the mechanical agitation should be of a sufficient rate and time duration to achieve satisfactory mixing of the DAF influent process in order to form the chemically modified agglomerates of secondary fiber contaminants.

EXAMPLES

In the examples given below, several polymers are compared for efficacy and compatibility. Polymer A is a particulate polyvinyl chloride, with an average particle diameter of ~170 microns and a specific gravity of 1.4. Polymer B is an acrylamide/acrylate anionic flocculent, 69 mole percent, RSV=46–56 dl/g. Polymer C is an acrylamide/acrylate anionic flocculant, 29 mole percent, RSV=41–54 dl/g. Polymer D is an acrylamide/DMAEA.MCQ (dimethylaminoethyl acrylate methyl chloride quaternary cationic flocculant, 10 mole percent, RSV=21–30 dl/g. Finally, Polymer E is a "linear" EPI-DMA (epichlorohydrin dimethylamine) cationic coagulant, with an intrinsic viscosity (I.V.)=0.15–0.29 dl/g.

Example 1

Laboratory stickies removal testing was performed on DAF influent process water from a Northeastern U.S. paper mill. The purpose of this testing was to determine whether Polymer A, a polyvinyl chloride, was a good stickies removal agent when used in conjunction with DAF polymers.

Simple screening tests were done first to identify the most effective coagulant and flocculant. Of the three flocculants tested: Polymer B, Polymer C and Polymer D; Polymer D exhibited the best activity. Polymer E was most effective in conjunction with Polymer D. The optimum dosages were 80 ppm Polymer E and 60 ppm Polymer D. Testing was performed using a gang stirrer (6 sample capacity). The DAF influent water from the Northeastern paper mill was allowed to come to room temperature and was mixed at ~400 rpm to keep sampling consistent. 800 mL aliquots were transferred to 1 liter beakers. The water in the beakers was mixed on the gang stirrer at ~100 rpm for 1 minute. The proper dosage of Polymer E was then added, and the mixing speed was increased to ~200 rpm for 30 seconds. At 30 seconds, Polymer D was added and mixing speed was decreased to ~100 rpm. Mixing continued for 2 minutes. The samples were allowed to settle and 20 ml aliquots were taken for turbidity readings.

Once the optimum DAF polymer dosages were determined, a dosage profile using Polymer A was performed. The procedure was the same as above, except that Polymer A was added to the sample first, and mixed for 1 minute at ~100 rpm. The proper dosage of Polymer D was then added, and the mixing speed was increased to ~200 rpm for 30 seconds. Polymer C was then added and the mixing speed was decreased to ~100 rpm. Mixing continued for 1 minute. The samples were allowed to settle and 20 ml aliquots were taken for turbidity readings. The following tests were performed:

A. "Control"—no treatment;
B. "Polymer A Only"—2, 20 and 50 ppm Polymer A without DAF polymers;
C. "Polymer D spiked with Polymer A"—20 ppm Polymer A was added to the made-down Polymer D;
D. "Polymer A/Polymer E/Polymer D"—Polymer A was added at 2, 20 and 50 ppm prior to the addition of the Polymer E and Polymer D.

In all tests where Polymer E and Polymer D were used, the polymers were dosed at 80 ppm and 60 ppm respectively. (For the "Polymer A Only" testing: Polymer A was added at ~200 rpm, mixed for 30 seconds, and the speed decreased to ~100 rpm for an additional 2.5 minutes).

The samples from all of the tests were allowed to settle and 20 ml aliquots were taken for turbidity readings. The samples were then filtered through a Britt-Jar screen. The solids/particulates remaining on the screen were washed off onto Whatman 41 filter paper using vacuum filtration. The filter paper was placed in a handsheet mold and allowed to dry overnight. The solids/particulates on the filter papers were then examined microscopically.

The "Control" (no treatment) had several stickies. The "Polymer E/Polymer D Only" samples also showed several stickies. The "Polymer A Only" samples showed a few stickies and several unattached Polymer A particles. The "Polymer A/Polymer E/Polymer D" samples showed that the Polymer A particles were attached to the stickies. All samples with Polymer A had excess unattached Polymer A particles in the effluent, which would be a reason for the increase in turbidity seen with the addition of Polymer A.

Example 2

Additional lab work was done to evaluate the effectiveness of Polymer A using the Northeastern U.S. paper mill's DAF operating conditions.

Simple screening tests were performed first to identify the most effective dosages of Polymer E and Polymer B. The DAF influent water from the was mixed at ~400 rpm to keep sampling consistent. 400 mL aliquots were transferred to 600 ml beakers. The water in the beakers was mixed on the gang stirrer at ~100 rpm for 1 minute. Polymer E was then added, and the mixing speed was increased to ~200 rpm for 30 seconds. At 30 seconds, Polymer B was added and the mixing speed was decreased to ~100 rpm. Mixing continued for 1 minute. The samples were allowed to settle and 20 ml aliquots were taken for turbidity readings.

Once an optimum Polymer B/Polymer E dosage was determined, a profile using Polymer A was performed. The procedure was the same as above, except that Polymer A was added to the sample first, and mixed for 1 minute at ~100 rpm. The proper dosage of Polymer E was then added, and the mixing speed was increased to ~200 rpm for 30 seconds. Polymer B was then added and the mixing speed was decreased to ~100 rpm. Mixing continued for 1 minute. The contents of the beaker were allowed to settle and 20 ml aliquots taken for turbidity readings. The 20 ml aliquot was then returned to its original beaker and the contents of the beaker was slowly poured into a 1 liter graduated cylinder for DAF clarification simulation tests.

To simulate DAF air injection, 100 ml of pressurized (50 psi) deionized water was added to the water sample via a wand inserted to the bottom of graduated cylinder. This technique introduces micro-bubbles of dissolved air. As soon as 100 ml of pressurized deionized water was added to the cylinder, a timer was started to determine the length of time it took for the solids (i.e. pulp fines, ash, stickies, etc.) to form a mat at the surface.

The water underneath the mat is called the DAF effluent for purposes of describing the invention. The DAF effluent was drained, via a valve at the bottom of the cylinder, from the cylinder. A 20 ml aliquot of the effluent was taken for a turbidity reading. Since the micro-bubbles from the simulated DAF process interfered with turbidity readings, the 20 ml aliquot was placed in an ultrasonic water bath for 5 minutes to remove the micro-bubbles. The mat from the simulated DAF air injection was filtered through a 40 µm screen using gravity filtration. Any particles remaining on the screen were then rinsed onto Whatman 41 filter paper and dried in drying rings overnight.

To obtain a total stickies count via image analysis, the effluent was drained from the cylinder and filtered through a 40 µm screen. A clean Whatman 41 filter paper was placed on top of the particulate covered filter paper and pressed with a 300° F. iron for 2 minutes. The two filter papers were then carefully separated, and anything adhering to the top filter paper was counted as a stickie. Image analysis was utilized to quantify the stickies adhering to the top filter paper.

Image analysis is a method used to quantify both dirt and stickies in handsheets. Image analysis can detect either dark particles on a light background (dirt count) or light particles on a dark background (stickies analysis). A reverse dye method is used to quantify light particles on a dark background. This method is outlined an article by M. P. Hacker, *TAPPI J.* 75 (7), 63, 1992, the disclosure of which is herein incorporated by reference. This method is performed by dyeing the handsheets with a dark colored water-soluble dye. Stickies, being primarily hydrophobic in nature, will not accept this dye. This leaves a light colored area which can be measured through image analysis in the reverse polarity mode. Some stickies are naturally dark in color; stickies of this kind are included in the dirt count data.

With the image analysis stickies/dirt data, a percent stickies/dirt removal efficiency (% SDRE) was calculated. Calculation of percent stickies/dirt removal is as follows:

$$\% SDRE = \frac{\text{Total count of untreated effluent} - \text{Total count of treated effluent}}{\text{Total count of untreated effluent}}$$

Where: Total count of untreated effluent=dirt count+stickies count for untreated effluent Total count of treated effluent=dirt count+stickies count for treated effluent Note: Stickies can pick up dark colored inks in the papermaking process and thus appear dark in color. For this reason, both dirt (dark particles on a light background) and stickies (light particles on a dark background) counts were included in the total counts for the treated and untreated effluents.

The Polymer B/Polymer E/Polymer A program worked very well in the lab on stickies removal. The Polymer B/Polymer E/Polymer A program had a 92.2% stickies/dirt removal efficiency and the Polymer B/Polymer E program had a stickies/dirt removal efficiency of 45.1%. The clarity of the DAF effluent was much better with the Polymer B/Polymer E/Polymer A program (23 NTU) than with the Polymer B/Polymer E program (72 NTU) and both treatment programs were better than the untreated DAF effluent (84 NTU).

Example 3

A short trial was run at a Northeastern U.S. paper mill to enhance stickies removal in the DAF clarification system through the incorporation of Polymer A in the Polymer B/Polymer E DAF polymer program. A stickies removal efficiency of up to 98.9% was achieved during the trial.

The trial was run to address a stickies/pitch/wax problem in the mill. The mill has two DAF clarifiers. One is an "effluent only" clarifier, where the accepts are sewered. The other is a "process" clarifier, where the accepts are recirculated back to the papermachine process water. The mill was interested in a DAF chemical treatment program that would decrease the amount of stickies/pitch/wax that carried over to the papermachine process water. Polymer treatments as described in Example 2 above were evaluated.

To determine the effectiveness of the trial, handsheets were made for stickies analysis and colloidal pitch counts were performed on the DAF influent and effluent. Colloidal pitch counts were performed using a microscope and a hemacytometer: $21.1 \times 10^7$ pitch particles/ml were obtained with 5 ppm Polymer E/8 ppm Polymer B, $4.4 \times 10^7$ pitch particles/m; were obtained with 15 ppm Polymer E/20 ppm Polymer B, and $2.8 \times 10^7$ pitch particles/ml were obtained with 15 ppm Polymer E/20 ppm Polymer B/90 ppm Polymer A. There was a significant decrease in the colloidal pitch counts with the addition of Polymer A to the treatment.

For stickies analysis, 500 ml of sample was filtered through a 200 mesh (76 μm) Britt Jar screen. The sample was washed with three liters of water to be certain all of the fibers were washed through the screen. The particles on the screen were then washed onto Whatman 41 filter paper. The filter paper was removed and the side with the particles was joined with a clean filter paper. The two filter papers were pressed together using a 300° F. iron for 2 minutes. The filter papers were then carefully separated, and any particles adhering to the top filter pad were counted as stickies.

Some of the particles adhering to the top filter paper were dark in color. These particles were counted with image analysis and were recorded as "dark" stickies. Other particles on the top filter paper were white in color or transparent. Since image analysis can only detect particles that have some contrast to the background, the top filter paper was dyed with a dark colored water soluble dye. Stickies, being primarily hydrophobic in nature, do not adsorb this dye. This leaves a light colored particle area which can be measured with image analysis techniques. This measurement was recorded as "light" stickies.

With the image analysis data, a percent stickies removal efficiency (%SRE) was calculated. Calculation of percent stickies removal was as follows:

$$\% SRE = \frac{\text{Total count feed} - \text{Total count}}{\text{Total count of feed}} \times 100$$

Where:

Total count feed=Total stickies count of the feed

Total count accepts=Total stickies count of the accepts The stickies removal efficiency (SRE) with 5 ppm Polymer E and 8 ppm Polymer B was 63.7%. Polymer B/Polymer E/Polymer A dosages were altered throughout the trial to determine the most efficient program. The most efficient program for stickies removal was with 15 ppm Polymer E/20 ppm Polymer B/90 ppm Polymer A. This program combination yielded a 98.9% stickies removal efficiency. With the 15 ppm Polymer E/20 ppm Polymer B program alone the SRE was 71.4%.

The use of Polymer A in combination with the Polymer E coagulant/Polymer B flocculant program proved to be highly effective in increasing the stickies removal efficiency in the DAF clarification system.

Example 4

A 30 day trial was run at the same Northeastern U.S. paper mill to enhance stickies removal in the DAF clarification system through the incorporation of Polymer A in the existing Polymer E/Polymer B DAF polymer program. Using the analysis techniques described in Example 3, a stickies removal efficiency of up to 98.9% was achieved during the trial.

The stickies removal efficiency (SRE) with 10 ppm Polymer E and 8 ppm Polymer B was 33.3%. Polymer E/Polymer B/Polymer A dosages were altered throughout the trial to determine the most efficient program. The most efficient program for stickies removal was with 18 ppm Polymer E/13 ppm Polymer B/80 ppm Polymer A. This program combination yielded a 98.9% stickies removal efficiency. With a 15 ppm Polymer E/13 ppm Polymer B program alone, the SRE was 88.4%.

The use of Polymer A in combination with the Polymer E coagulant/Polymer B flocculant program proved to be highly effective in increasing the stickies removal efficiency in the DAF clarification system.

Changes can be made in the composition, operation and arrangement of the method and the polymers of the present invention described herein without departing from the concept and scope of the invention as defined in the following claims:

What is claimed:

1. A method for removing secondary fiber contaminants from paper mill process waters comprising:

adding a polyvinyl chloride, a cationic polymeric coagulant and a polymeric flocculant to paper mill process waters containing secondary fiber contaminants in an amount sufficient to agglomerate the secondary fiber contaminants to larger particle sizes; and removing the secondary fiber contaminants from the process waters by a dissolved air flotation clarification process.

2. The method according to claim 1 wherein agglomeration is conducted at a temperature in the range between about 70° F. to about 160° F.

3. The method according to claim 2 wherein agglomeration is conducted at a temperature in the range between about 100° F. to about 140° F.

4. The method according to claim 1 wherein the polyvinyl chloride is added to the paper mill process waters in an amount between about 10 parts per million to about 100 parts per million, based on the volume of the paper mill process water.

5. The method according to claim 1 wherein the cationic polymeric coagulant is added to the paper mill process waters in an amount between about 1 to about 50 parts per million based on the volume of the paper mill process water.

6. The method of claim 1, wherein the polymeric flocculant is added to the paper mill process waters in an amount between about 1 to about 25 parts per million based on the volume of the paper mill process water.

* * * * *